(12) United States Patent
Drumm et al.

(10) Patent No.: US 7,533,122 B2
(45) Date of Patent: May 12, 2009

(54) SYSTEM AND METHOD FOR MATCHING SCHEMA ELEMENTS TO ONTOLOGY ACCORDING TO CORRESPONDENCE TEST

(75) Inventors: Christian Drumm, Karlsruhe (DE); Philipp Kunfermann, Lachen (CH)

(73) Assignee: SAP AG, Walldorf (DE)

( * ) Notice: Subject to any disclaimer, the term of this patent is extended or adjusted under 35 U.S.C. 154(b) by 163 days.

(21) Appl. No.: 11/635,930

(22) Filed: Dec. 7, 2006

(65) Prior Publication Data
US 2007/0143285 A1 Jun. 21, 2007

(30) Foreign Application Priority Data
Dec. 7, 2005 (EP) ................... 05026697

(51) Int. Cl.
*G06F 17/00* (2006.01)
(52) U.S. Cl. ...................... 707/102; 707/100
(58) Field of Classification Search ................. 707/102, 707/100
See application file for complete search history.

(56) References Cited

U.S. PATENT DOCUMENTS 7,146,399 B2 * 12/2006 Fox et al. ..................... 709/203
2003/0177481 A1 * 9/2003 Amaru et al. ................ 717/148

FOREIGN PATENT DOCUMENTS

WO WO-2005031603 4/2005

OTHER PUBLICATIONS

Pottinger et al, "Merging Models Based on Given Correspondence", Proceedings of the 29th VLDB conference, Sep. 2003, pp. 862-873.*
Bernstein et al, "Industrial-Strength Schema Matching", SIGMOD Record, vol. 33, No. 4, Dec. 2004, pp. 38-43.*
Aumueller et al, "Schema and Ontology Matching with COMA++", ACM 2005, pp. 906-908.*
"European Search Report for Application No. EP05026697.2", (May 2006), 6 pgs.
Lu, Xiao , et al., "Automatic mapping from XML documents to ontologies", *IEEE*, Computer and Information Technology Fourth International Conference on Wuhan, China Sep. 14-16, 2004, Piscataway, NJ, (Sep. 14, 2004), 321-325.
Myungsook, Kim , et al., "Ontology-DTD matching algorithm for efficient XML query", *Fuzzy systems and knowledge discovery. Second International Conference, FSKD, 2005. Proceedings, Part II* (*Lecture notes in artificial intelligence* vol. 3614, (Aug. 27, 2005).
Saake, G , et al., "Rule-based schema matching for-ontology based mediators", *Journal of Applied Logic, Elsevier,* vol 3(2), (Jun. 2005).

* cited by examiner

*Primary Examiner*—Uyen T. Le
(74) *Attorney, Agent, or Firm*—Schwegman, Lundberg & Woessner, P.A.

(57) ABSTRACT

A matching system stores an element of schema that is identifiable with a child node of a parent node of a tree. An entity group of ontology includes a subclass of a class of further entity group matching to a parent element identifiable with the parent node is stored. An access unit accesses the element of the schema and the entity group of the ontology. A match unit matches the elements of the schema to the entity groups of the ontology when the elements correspond to the entity groups according to a correspondence test.

26 Claims, 7 Drawing Sheets

```
def SchemaNode node
def OntClass class
uses match = findSubClassMatch(node,class)
uses match = findPropertyMatch(node,class)
uses boolean = hasEnoughMatches(MatchList)
```

```
function Concept-Finder (node, class)
    for each childnode in children of node
        match = Compare-Node(childnode, class)
        if (match != null)
            store match
        else if
            store "no match for:" node.name
        end if
    end for
end function
```

```
function match = Compare-Node(node, class)
    match = findSubClassMatch(node,class)
    if (match = null)
        match = findPropertyMatch(node,class)
        if ( match = null)
            if depth < limit
                depth++
                for each childnode in children of node
                    add Compare-Node(childnode,class) to
                        MatchList
                end for
                if hasEnoughMatches(MatchList)
                    match = <node,class,"subclassmatch">
                end if
            end if
        end if
    end if
    if match != null
        Concept-Finder(match.node,match.class)
        return match
    else
        return null
    end if
end function
```

SYSTEM AND METHOD FOR MATCHING SCHEMA ELEMENTS TO ONTOLOGY ACCORDING TO CORRESPONDENCE TEST

CLAIM OF PRIORITY

The present patent application claims the priority benefit of the filing date of European Application (EPO) No. 05026697.2 filed Dec. 7, 2005, the entire content of which is incorporated herein by reference.

TECHNICAL FIELD

Example embodiments generally relates to the field of electronic data processing and more specifically to data exchange.

BACKGROUND

In recent years, the exchange of data in electronic format has continuously increased. The number of parties participating in the exchange of the data has increased as well as the number of different types of the data. This development has led to concepts how to structure and describe the data so that the data can be exchanged in a flexible way. This may for example include transferring a data set with a description of elements of the data set so that a transferred message has self-contained parts. Therefore, a receiver of the transferred message may be able to understand the transferred message even if details of how to transfer the data set have not been specified.

One way to describe data is to use a schema, for example, a schema of the Extensible Markup Language (XML). Within XML, XML schema definition (XSD) may be used to define structures of valid XML documents. The XML documents are instances of a specific schema. XML is a widespread standard for representing information in the World Wide Web (WWW). Generally, XML represents the information in a semi-structured form and has many applications beyond the WWW. Extensibility, simplicity, and interoperability are some of the reasons why XML is popular for Web technologies and data exchanges today. XML is a markup language for structuring information and a single XML document may include different data. Therefore the different data can be sent in the single XML document in an efficient way over the Internet. This provides a flexible way for interchanging data between different systems that may be owned by different companies. Such data interchanges between different companies are more and more desired because globalisation demands to share and integrate electronic information quickly without specifying details of each data interchange.

XML may be used for such interchanges of data. However, when the structures of data models in communicating systems are not equal postprocessing may be required due to occurring conflicts. As an example, a first structure of data used in a first company may be described in a first XML schema. A second structure of data used in a second company may be described in a second XML schema that differs from the first schema. The second company may create transformation instructions that transform data of the first schema to data of the second schema. The transformation instructions may be for example mappings allowing computers to understand that element x in the first schema corresponds to element y in the second schema. As an example, the first schema may contain a data element "Vendor" and the second schema a data element "Seller". A human being may be able to guess, possibly using additional knowledge sources that these elements correspond to an identical entity, that is, a party that sells a product or a service. Therefore, the human being may define a mapping rule that maps instances of "Vendor" to instances of "Seller" when passing information from the first company to the second company. Such a naming conflict is an example of conceptual differences that occur in data schemas and that are known as semantic heterogeneity.

A further way to represent data is to use an ontology. The idea of using ontologies has been suggested for a semantic web. In the semantic web data may be described or defined in such a way that a machine can understand a content of the data. The semantic web is a step towards making the Internet "artificially intelligent" and adding value by facilitating a more autonomous information interchange between machines. One benefit of the computer understanding an interpretation of data is more efficient web querying. For example, a computer being able to differentiate between Java being a kind of coffee, an island, and a programming language may be able to provide better search results than a computer without a semantic understanding. Interoperability is a further aspect when interaction between applications on the Web is required. As an example, a computer may be able to discover and understand autonomously information that a further application provides. This may be used for web services where independent applications are meant to interact with each other in order to create a modular application of higher value. With a semantic web, it may be possible that applications can for example exchange data without a programmer manually configuring the applications.

An article with title "Towards Semantic Web Engineering: WEESA—Mapping XML Schema to Ontologies" by Gerald Reif, Mehdi Jazayeri, and Harald Gall discloses a manual mapping of schemas to ontologies at a design level. The article is available the Department of Informatics of the University of Zürich, Switzerland using an internet site related to Harald Gall.

DETAILED DESCRIPTION

Following examples and exemplary embodiments may have specific features for illustrative purposes. The specific features are not intended to limit the scope of the invention or to be exhaustive regarding embodiments of the invention.

In an example embodiment, data may be represented according to different concepts: a schema may include elements that are parts of the data and that have identifiers and relations between the elements, wherein the elements and the relations may be represented as a tree structure; an ontology may include classes, properties, and property ranges.

An aspect of the example embodiments includes transforming a part of a data set between a schema representation and an ontology representation.

According to the aspect, an example embodiment is a system for matching elements of the schema to entity groups of the ontology. An element of the schema matched to an entity group of the ontology may be used to transform a part of the data set between different representations, the part of the data set being identified by the element or the entity group. The system is high-performance because a match between the element and the entity group may be used to transform many data sets in an identical way. Also, the system finds a match by taking a known match into account and therefore reducing a number of entity groups that are tested for a match. Furthermore, the system is reliable because different aspects of the ontology are taken into account for finding the match. Accordingly, high rates of successful matches and therefore transformations are achievable.

According to the aspect, a further embodiment of the example embodiments is a computer-implemented method for matching elements of the schema to entity groups of the ontology. The method shares advantageous features of the system for transforming data sets between the representations.

A further embodiment of the example embodiments is a computer program product related to the method. Accordingly, the computer program product shares advantageous features of the method.

Figure 1:
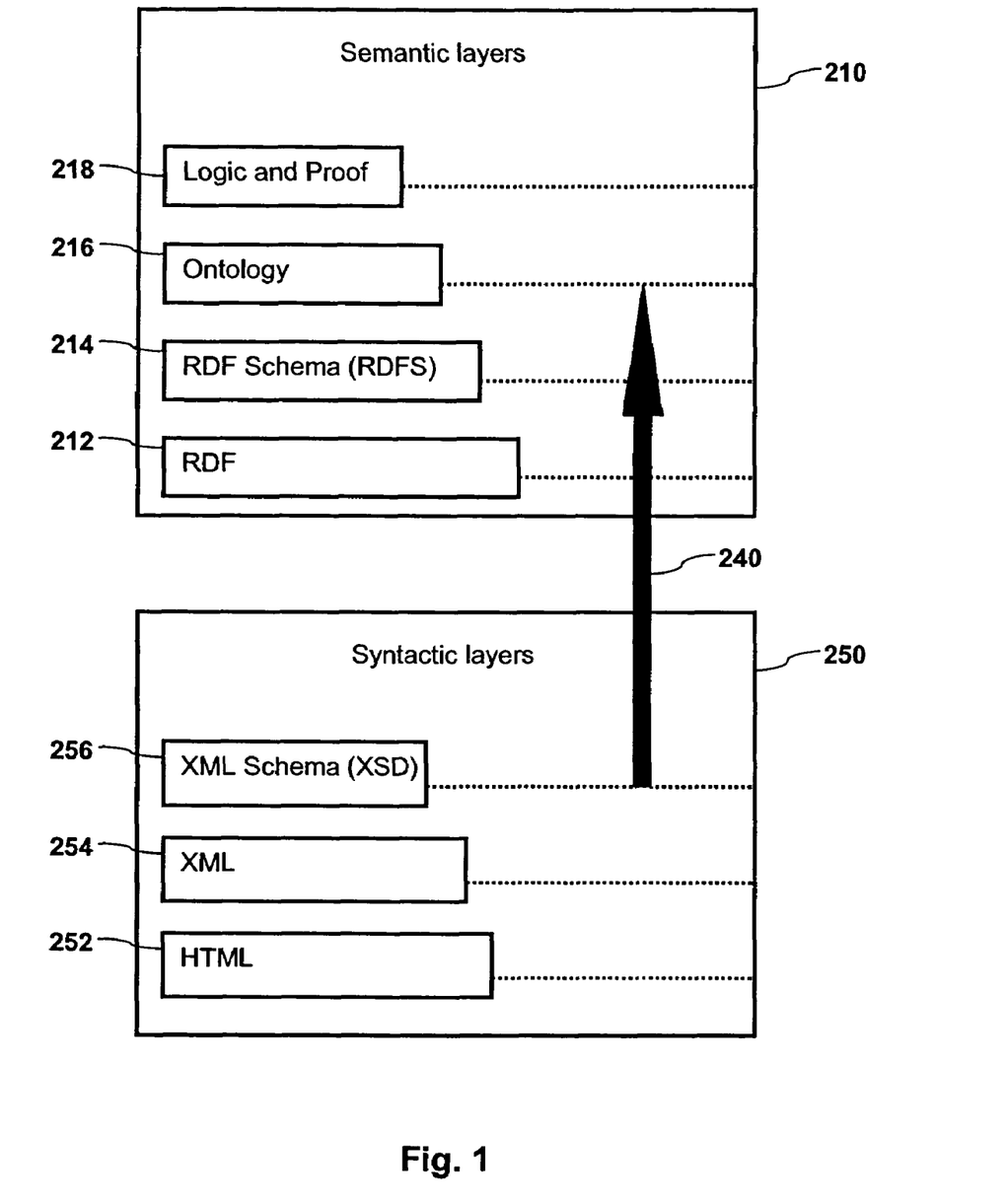
FIG. 1 displays semantic and syntactic layers and identifies layers that are relevant for an embodiment of the invention.

FIG. 1 displays semantic 210 and syntactic layers 250 and identifies layers that are relevant for an embodiment of the invention. The embodiment of the invention is a system for matching elements of an XML schema to entity groups of an ontology. The system is described in detail in a following part of the description that relates to FIG. 2. In further embodiments of the invention further schemas and further ontologies may be used differing from displayed layers. Definitions of a schema and an ontology with features that are relevant to embodiments of the invention are given in the part relating to FIG. 2. FIG. 1 gives an overview over different concepts that are widespread today and puts the embodiment into a context of the widespread concepts.

The syntactic layers 250 include the hypertext markup language (HTML) layer 252, the XML layer 254, and the XML schema layer, that is, XSD layer 256. HTML is frequently used for creating hypertext documents in the WWW. XML is a higher level standard for creating markup languages. XML has features for structuring data in a tree structure in a machine readable format. An XSD is an instance of an XML schema written in the XML schema language. Compared to XML the XML schema includes further features for specifying elements, attributes and data types.

The semantic layers 210 include the resource description framework (RDF) layer 212 that is a language for describing resources in the WWW by creating statements on how the resources are related. RDF is a specification of a model to represent metadata. A RDF schema layer 214 adds features for describing classes and properties to the RDF. An ontology layer 216 further adds a vocabulary to describe a relevant view of an area, that is, it adds contents to an RDF schema that provides the structural elements. A logic and proof layer 218 further adds features so that knowledge representation systems can work with an ontology and reasoning systems can draw conclusions from the ontology.

The layers that participate in the embodiment of the system are the ontology layer 216 and the XML schema layer 256. The matching of the elements of the XSD to the entity groups of the ontology are represented by an arrow 240. The matching may also be called a lifting of the XSD to the ontology.

Figure 2:
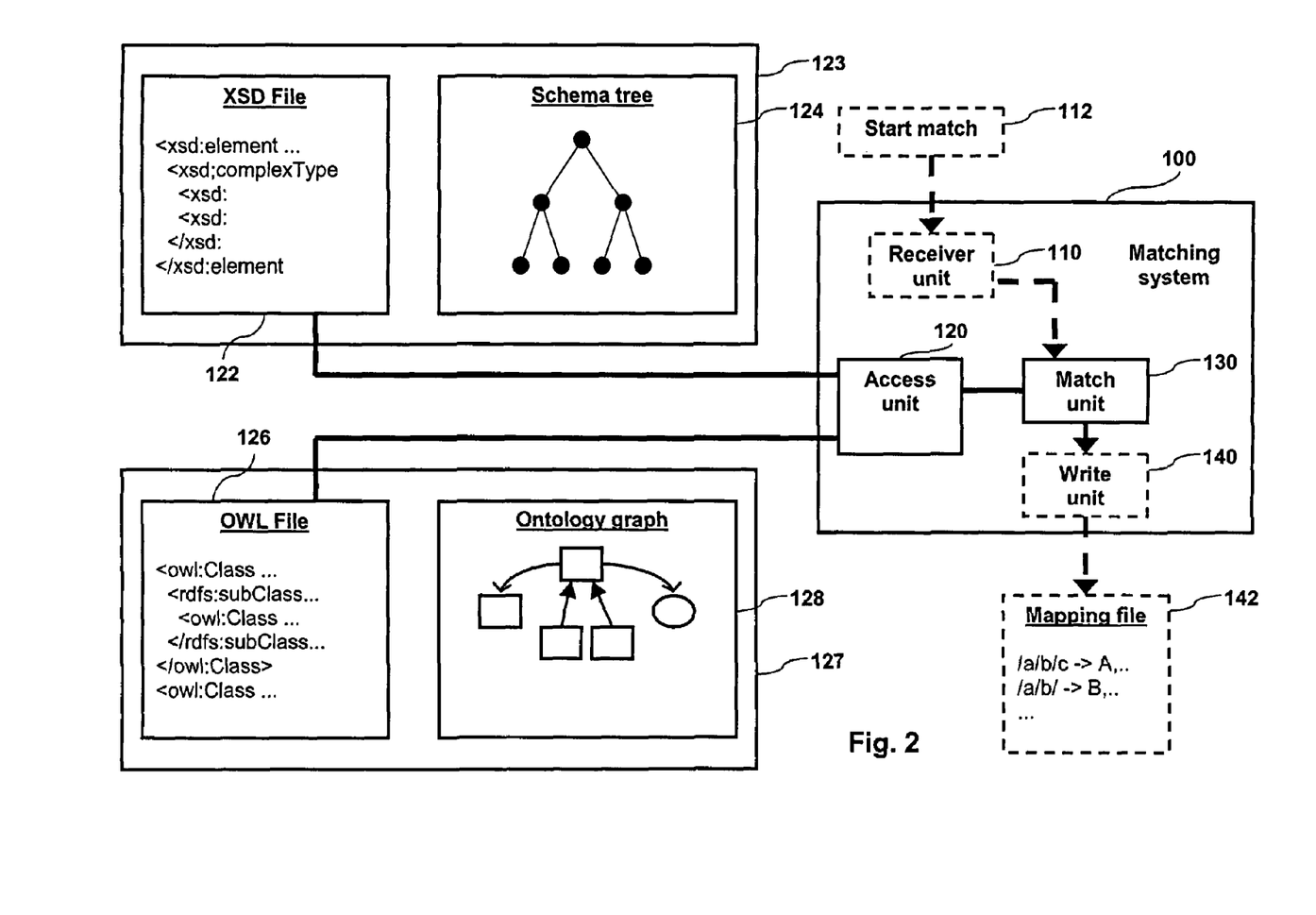
FIG. 2 is a simplified diagram with an exemplary embodiment of the invention and exemplary schema and ontology representations.

FIG. 2 is a simplified diagram with an exemplary embodiment of the invention and exemplary schema and ontology representations. The exemplary embodiment is a system 100 for matching elements of an XML schema to entity groups comprised of classes and properties of an ontology. Representations 123 of the XML schema include an XSD file 122 and a schema tree 124 and representations 127 of the ontology include a web ontology language (OWL) file 126 and an ontology graph 128. Results of the system 100 are written to a mapping file 142. A Line between two elements represents an interface configured to exchange data between the two elements and an arrow represents a data transfer in an indicated direction. Optional elements related to the system are displayed in dashed lines.

The exemplary schema is defined according to XSD. In a further example, further schemas may be used. The further schemas may not be a standard schema but for example a schema describing data stored in one or more data base tables. Such schemas are also called data base schemas. With respect to embodiments of the invention a schema is defined by including elements and relations between the elements, wherein the elements are identifiable with nodes of a tree and the relations are identifiable with relations between the nodes of the tree. An element of a schema is identifiable with a node of a tree in case that the element can be identified with the node, that is, the schema can be represented as a tree structure and the element can be interpreted as being the node of the tree structure.

The exemplary ontology is described according to OWL. In a further example, an ontology according to a further specification may be used. With respect to embodiments of the invention an ontology is defined according to the following features: the ontology has classes and the classes may have properties and may be related by inheritance relations. Classes, properties, and inheritance relations of the ontology are entities of the ontology. A class of the ontology may be also called a concept of the ontology. A property of a class has a range that specifies one or more property values. The range may include a further class or a datatype, for example, a string. A property with a range that includes a class is an object property and a property with a range that includes a datatype is a datatype property. A class may be related to a further class by an inheritance relation, that is, the class is a subclass of the further class. The subclass inherits properties of the further class.

An ontology may have further features that are not relevant in embodiments of the invention. Embodiments of the invention may use the described features. Furthermore, modelling data with an ontology may include further rules which affect the way how the ontology is defined but not with which parts. Furthermore, the expressiveness of the OWL is not relevant to embodiments of the invention, that is, for example OWL Lite, OWL DL, or OWL Full may be used in an embodiment according to the invention.

The system 100 is an exemplary embodiment of a system for matching elements of a schema to entity groups of the ontology. The system may be a computer system for running programs such as a personal computer or an application server. An entity group of the ontology is comprised of classes or properties of the ontology. More specifically the entity group may be a class, a datatype property, or an object property with a range of the object property.

The system 100 includes a first storage means configured to store an element of the schema, such as the XSD file 122. In a further example, the first storage means may be a further means to store the element of the schema, for example, a data structure stored in a portion of a memory or an external memory device such as a hard disc drive. The XSD file 122 may be stored, for example, on a hard disc drive of the system or in a memory portion of the system. The element of the schema is identifiable with a child node of a parent node of a tree wherein the child node may be one or more generations younger than the parent node.

The system includes a second storage means configured to store an entity group of the ontology, such as the OWL file 126. An embodiment of the second storage means may be similar to a possible embodiment of the first storage means. The entity group of the ontology includes a subclass of a class of a further entity group or a property of the class. The further entity group matches to a parent element identifiable with the parent node.

The system 100 includes an access unit 120 configured to access the element of the schema and the entity group of the ontology. In the example, the access unit accesses the XSD file 122 including the element of the schema. The access unit may include a hard disk drive and a program controlling accesses to files on the hard disc drive. In a further example the access unit may include also a program for allocating and controlling memory space of a computer system. In a further example, the schema may be provided by a plurality of first storage means and an access unit may access different files when matching different elements. In the example, the access unit 120 is configured to access the OWL file 126 including the entity group of the ontology. The element and the entity group are related because the element is identifiable with the child node of the parent node of the tree and the entity group is assigned to the further entity group that matches to a parent element identifiable with the parent node. The entity group being assigned to the further entity group means that the entity group includes a subclass of a class of a further entity group or a property of the class.

The system 100 includes a match unit 130 configured to match the element of the schema to the entity group of the ontology in case that the element corresponds to the entity group according to a correspondence test. The match unit may for example include a computer chip executing instruction according to a program.

The system 100 may further have an optional receiver unit 110 configured to receive start match 112, that is, an identifier of the parent element and an identifier of the further entity group. The start match 112 may be entered by a user starting the system 100. In the example, the start match may be the only input provided by the user.

In the example, the correspondence test is configured to test different possible matches between the element of the schema and the entity group of the ontology. The different possible matches are tested sequentially in an order. The order of testing the matches may be different in a further example. Furthermore, in a further example, the correspondence test may test less possible matches than in the present example.

First, the correspondence test compares an identifier of the element with an identifier of a subclass of the class of the further entity group. Therefore, the correspondence test tests a possible match of the element to the entity group being a subclass of the class of the further entity group. For this, the correspondence test is configured to test if any one of the following relations exists between identifiers of the element and the subclass: the identifiers are identical, the identifiers are synonymous, the identifiers are similar according to a first similarity test. Identical identifiers of the element and the subclass can be tested by a literal comparison of the identifiers. Synonymous identifiers, such as Vendor for the element and Seller for the subclass may be found by using for example WordNet. WordNet is an online lexical database for the English language provided by Princeton University in New Jersey, USA. The first similarity test includes three subtests for similarity. The subtests give quantitative results evaluating a similarity aspect and the system may have similarity parameters specifying when a subtest is successful or not: a result value less than a similarity parameter may be interpreted as the identifiers being not similar and a result greater than or equal to the similarity parameter may be interpreted as the identifiers being similar. A first subtest for the element identifier A and subclass identifier B may be s_1 defined by $$s\_1(A, B) = 1 - \text{dist}(A, B)/\text{maxLength}(A, B).$$

The function dist (A, B) gives the number of different letters between A and B and maxLength (A, B) gives the number of letters of the longest identifier of A and B. In case the A and B are totally different the function dist (A, B) is equal to maxLength (A, B) because all letters of the longer expression of A and B are different from the other expression. The function dist (A, B) may ignore the difference between capital and small letters but in a further example the difference may be taken into account. In the example, a similarity parameter for s_1(A, B) may be 0.7 but in further examples the similarity parameter may be different and even vary if no match is found in a first series of finding matches.

The second subtest s_2(A, B) is defined by $$s\_2(A, B) = \max(s\_1(A, X); \text{ for all } X \text{ found being synonymous to } B).$$

Therefore s_2 takes is equal to the largest similarity value according to s_1 with respect to found synonyms of B. In the example, a similarity parameter for s_2 may be also equal to 0.7.

The third subtest s_3(A, B) calculates a similarity by splitting A and B into tokens and by counting with a weight factor similarities between individual tokens of A and B. Tokens may be identified by a CamelCase, that is, a capital case not at the beginning of an expression, or delimiters such as decimals, spaces, underlines or dashes.

$$s\_3(A, B) = \text{sum}\_(\text{over } i \text{ and } j)(s\_1(A\_i, B\_j))/(w\_A * t\_A + w\_B * t\_B), \text{ with}$$

A_i, i=1, . . . , t_A tokens of A, t_A being the number of tokens of A,

B_j, j=1, . . . , t_B tokens of B, t_B being the number of tokens of B, and w_A a weight factor for weighing the numbers of tokens of A, w_B a weight factor for weighing the numbers of tokens of B, and w_A+w_B=1.

As an example, A may be ExprDate giving two tokens Expr and Date and B may be hasCardExpiryDate giving four tokens has, Card, Expiry, and Date. With a numbering of the tokens according to the sequence of occurrence in the identifiers it follows s_1(A_1, B_3)=0.67, s_1(A_2, B_4)=1, and the other token results are equal to zero. In the example, with w_A=0.9 and w_B=0.1 it follows s_3(A, B)=0.76 which may be interpreted as a match of the identifiers with a similarity parameter for s_3 of 0.7.

The correspondence test of the system 100 is further configured to compare an identifier of the element with an identifier of a datatype property of the class of the further entity. Therefore, the correspondence test tests if the element matches to the entity group that is the datatype property. Such a comparison may be only done in case that the entity group is a datatype property. The correspondence test is configured to test if any one of the following relations exists between identifiers of the element and the datatype property: the identifiers are identical, the identifiers are synonymous, the identifiers are similar according to a second similarity test. In the example, the second similarity test is identical to the first similarity test. However, in a further example, the tests may be different by using different or further subtest functions or by using different similarity parameters. The reason for using different parameters may be that a match of the element to a subclass may be more favourable than a match of the element to a datatype property. Accordingly, the similarity parameter for a match of the element to the subclass may be smaller than the similarity parameter for a match of the element to the property. As a consequence the match of the element to the subclass may have a higher probability than the match of the element to the property.

The correspondence test is further configured to compare an identifier of the element with an identifier of an object property of the class of the further entity group and an identifier of a range of the object property. Such a comparison may be done only in case that the entity group consists of an object property and a range. The correspondence test is configured to test if the identifier of the element corresponds to the identifier of the object property and the identifier of the range according to a third similarity test. In the example, the third similarity test s_pr for element identifier A, object property identifier B and range identifier C is defined as $prf*s(A, B)+(1-prf)*s(A, C)$ if $s(A, B)>t$ and $s(A, C)>t$ $s(A, B)$ if $s(A, B)>t$ and $s(A, C)<t$ $s(A, C)$ if $s(A, B)<t$ and $s(A, C)>t$ $0$ if $s(A, B)<t$ and $s(A, C)<t$, with prf being a property range factor which weighs a similarity of a property and is accordingly between 0 and 1. In the example, prf may be between 0.5 and 0.7 taking into that a property identifier is frequently longer than a class identifier and therefore a higher weight is given to a comparison with the property identifier. Parameter t is a similarity parameter that is valid for evaluating if the element identifier is similar to the object property identifier and the range identifier. In a further example, two different similarity parameters may be used for evaluating the similarity between the element identifier and the object property identifier and the element identifier and the range identifier. The function s(A, X) may be a subtest function identical to s_1(A, X), s_2(A, X), or s_3(A, X).

In the example the element identifier is compared with both the object property identifier and the range identifier because the element identifier may only be similar to the range identifier. This is the case in the example that the element identifier is Address, the object property identifier is hasHome, and the range identifier is Address. Furthermore, the object property identifier is also tested because the range identifier may not be sufficient for a match. This is the case in the example that the element identifier is ShipToAddress, the range identifier is Address and there are two object property identifiers hasShipToAddress and hasBillToAddress.

In case that the element cannot be matched to the entity group according to any one of the previous correspondence tests the correspondence test may be further configured to find a derived match. The derived match relies on a comparison of child nodes related to the element with further entity groups that are assigned to the entity group. The child nodes related to the element may be related by one or more generations to the element. Accordingly the correspondence test is configured to test if one or more elements identifiable with child nodes of the child node match to one or more entity groups that comprise subclasses of a class of the entity group, properties of the class, or properties of the subclasses. The correspondence test is configured to evaluate matches of the one or more elements to the one or more entity groups according to an evaluation function. In the example, the evaluation function s_eval counts the number of matches possible with the child nodes related to the element. The test for the matches are according to s_1, s_2, s_3, and s_pr as described previously. However, the value s_eval depends on the number of child nodes and is therefore compared to a similarity parameter p_matches that is defined as $p\_matches=1$ if $n\_child<1$ and $p\_matches=\log(n\_child)$ if $n\_child>1$, with log the logarithm function to the basis 2 and n_child the number of child nodes related to the element. In the example, a successful derived match of the matched element and the entity group is characterised as a derived match. A user of the system may be informed through a user interface that the match is a derived match and may choose to check the derived match.

Following a successful match according to any one of the previous correspondence tests a further unmatched element may be matched to a further entity group. The sequence how to select the further unmatched element may vary with different embodiments of the invention. In the system 100 the further unmatched element may be child element related through a child node to the element and in case that no child element is available a sibling element related through a sibling node to the element may be selected as the further unmatched element. Repeating the correspondence test with the further unmatched element and following this with still further unmatched elements it may be possible to match all elements of the schema to entity groups of the ontology. In case that an element may no be matched to any entity group the system may specify the element and write a log file with an identifier of the element. A user of the system may check if a match of the element is possible in a manual way. Frequently, an ontology has much more entities and is much more complete than a schema and therefore each element of the schema has a high probability to match to an entity group of the ontology.

Following a comparison of all elements of the schema the system 100 uses a write unit 140 configured to write to the mapping file 142. The mapping file includes descriptions of matches of elements of the schema to entity groups of the ontology. In a further example, a description of a match may be written to the mapping file prior to matching a following element to a following entity group.

The system 100 matches elements of the schema to entity groups of the ontology in an automated way. The number of elements of the schema may be large so that a manual matching procedure of a user may not be convenient. Furthermore, complicated structures modelled by the ontology including for example inherited properties may be inconvenient for a user. The system is efficient because it uses a feature of the ontology, that is, the ontology is understandable by a machine. Furthermore, the system uses semantic information of the ontology and explores paths of the structure of a tree representing the schema to reduce mismatches.

The system 100 may be used to match a first schema to a second schema by matching the first schema to an ontology and the second schema to the identical ontology. The resulting mappings of the first and second schemas to the ontology may be used to match the elements of the first schema to the elements of the second schema and create a mapping between the schemas. Such a procedure may be convenient because an ontology may include more information than the schemas and therefore may include elements of two or more different schemas.

Figure 3:
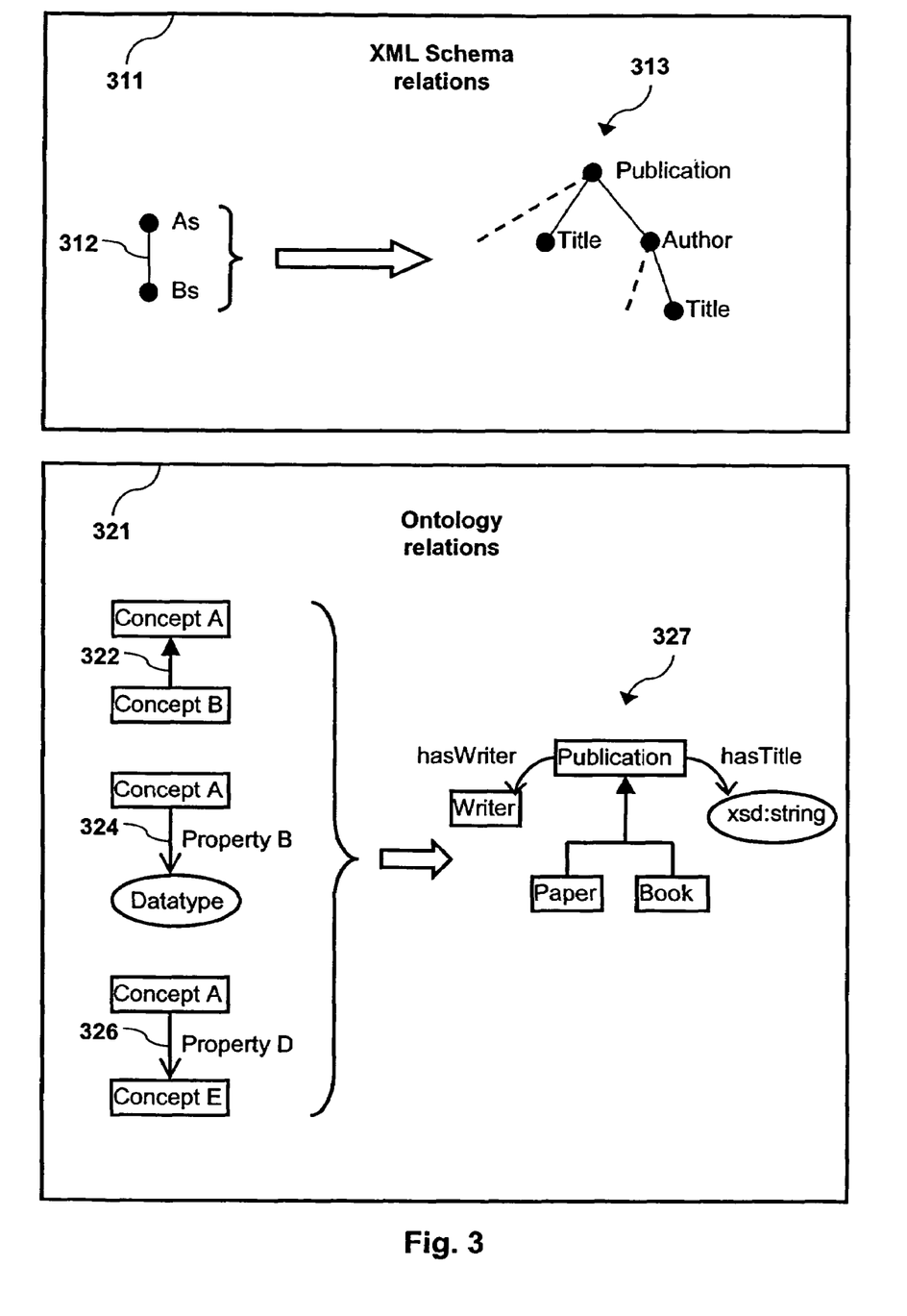
FIG. 3 shows basic parts and examples of a schema and an ontology.

FIG. 3 shows basic parts and examples of a schema and an ontology. Elements related to the schema are in a first box 311 and elements related to the ontology are in a second box 321. The example of the schema is an instance of an XML schema, that is, an XSD. A relation 312 of the schema relates elements As and Bs. An element of an XSD may include a name which specifies the element. An XSD may be used to structure data sets and identify parts of the data sets. Using elements and relations as basic parts the XSD can be constructed. In accordance with embodiments of the invention the elements of the XSD can be identified with nodes of a tree. The relations between the elements specify child nodes and parent nodes of the nodes.

An exemplary tree representation 313 of the XSD may have a root node representing an element named Publication. Child nodes of the root node are named Title and Author. There may be further child nodes of the root node. From the parent node of the node Title, that is, the node named Publication it follows that Title may be identified with a title of Publication. The child node named Author has a child node named Title which represents a title of the author, such as "Dr.". Therefore, the tree has two nodes with an identical name. The name title is an example of an homonym, that is, an expression having two different meanings. In the tree 313 the specific meaning is clear from the context of the corresponding node. According to embodiments of the invention both nodes named Title are child nodes of the root node of different generations.

The basic parts of the ontology are classes also called concepts, inheritance relations, properties. Inheritance relation 322 is represented by an arrow from Concept B to Concept A. Therefore, Concept B is a subclass of Concept B and inherits properties from Concept A. Datatype property C 324 is represented by a further arrow type and indicates that Concept A has a property C that has a range of Datatype, that is, a range that may be described by a definition of a datatype. Object property D 326 is a property of Concept A and has a range identical with Concept E. With the three different relations 322, 324, and 326 an ontology can be constructed. A graphical example 327 of an ontology has a class named Publication and subclasses Paper and Book. Furthermore, the class Publication has an object property named hasWriter and the object property has a range identical to a class named Writer. The class Publication has a datatype property named hasTitle with a range that is a string. The properties of Publication are also properties of the subclasses Paper and Book. An ontology may have a restriction prohibiting using homonyms.

Figure 4:
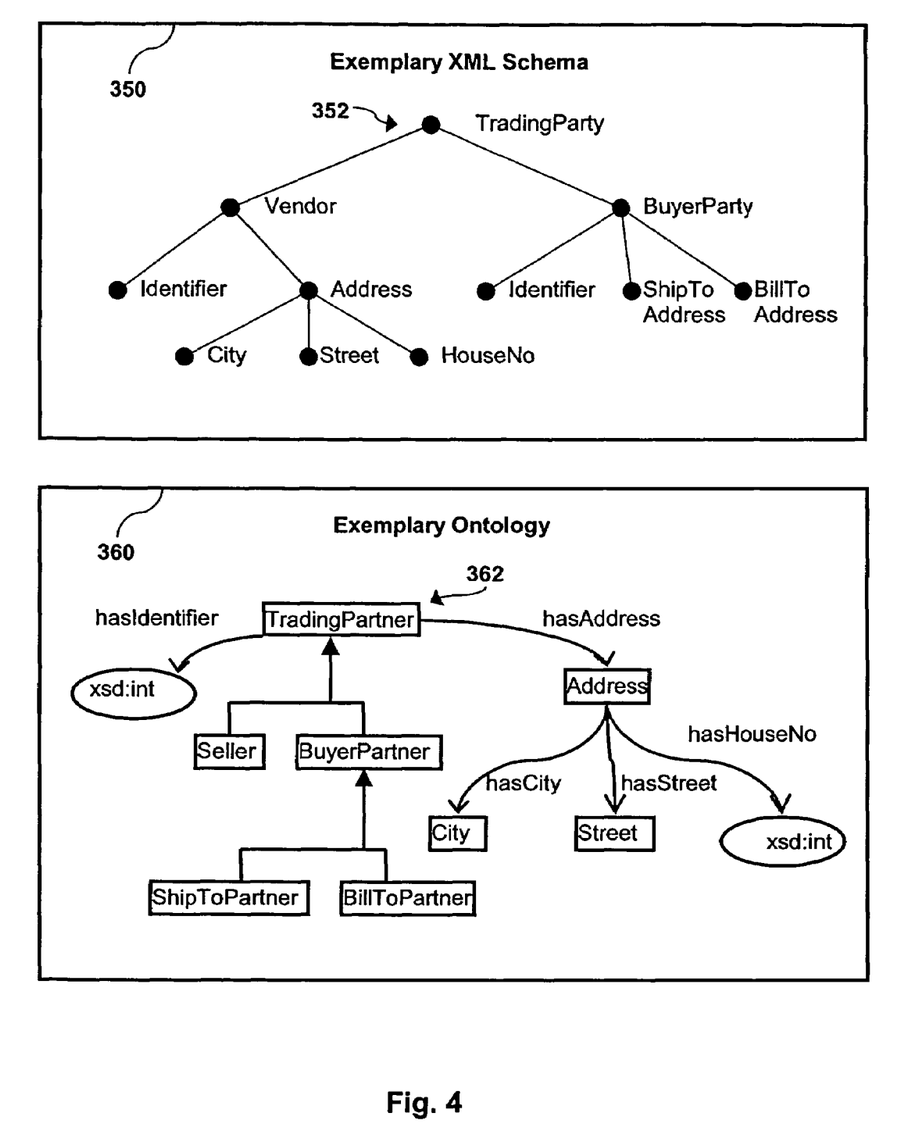
FIG. 4 shows an exemplary XML schema and an exemplary ontology.

FIG. 4 shows an exemplary XML schema 350 and an exemplary ontology 360. The exemplary XML schema 350 has a tree representation with a root node named TradingParty having child nodes Vendor and BuyerParty. The Vendor node has child nodes Identifier and Address that again has child nodes named City, Street, and HouseNo. The BuyerParty has child nodes Identifier, ShipToAddress, and BillToAddress.

The exemplary ontology 360 has a graphical representation with a class named TradingPartner. TradingPartner has subclasses Seller and BuyerPartner that again has subclasses ShipToPartner and BillToPartner. Furthermore, TradingPartner has two properties, first a datatype property named hasidentifiers with an integer range according to XSD and a second object property named hasAddress with a range of class named Address. Address has object properties hascity with range class named City and hasStreet with range class Street. Address has further a datatype property hasHouseNo with an integer range.

In the following a simplified description is given how an exemplary system may match elements of the exemplary schema to entity groups of the exemplary ontology. The exemplary system may receive through the optional receiver unit a start match with an identifier of the TradingParty element and the TradingPartner class. Traversing the schema tree from left to right the exemplary system may find an element of the schema identifiable with the Vendor node that is a child node of TradingParty. The exemplary system applies a correspondence test to compare Vendor to names of subclasses of TradingPartner and properties of TradingPartner. In the example, the system may have a result that no such match has been found and accordingly the system tests for a derived match including the element related to the Vendor node. The exemplary system may evaluate that an element identifiable with the Identifier node can be matched to the inherited property hasidentifiers of Seller and that an element identifiable with the Address node can be matched to the inherited object property hasAddress and the range Address. Furthermore, elements identifiable with child nodes of the Address node may be tested to match to entity groups assigned to the class Address. As a result, the element identifiable with the City node may be evaluated to matched to the property hasCity and the range City, the element identifiable with Street may be matched to the property hasStreet and the range Street, and the element identifiable with the HouseNo node may be matched to the property hasHouseNo. Further child nodes of a further generation of the node Address are not available for testing and evaluation because the City, Street, and HouseNo nodes are leaf nodes without further child nodes. Based on the results of the evaluations the system may match the element identifiable with the Vendor node to the class Seller being a subclass of TradingPartner. The system may further characterize the match as a derived match so that a further check may be done at a later point of time. A person skilled in the art will appreciate that in an analogous way the exemplary system may match an element identifiable with node BuyerParty to class BuyerPartner, an element identifiable with child node Identifier of BuyerParty node to property hasidentifier of class BuyerPartner, an element identifiable with node ShipToAddress to property hasAddress of class ShipToPartner and range Address, and an element identifiable with node BillToAddress to property hasAddress of class BillToPartner and range Address.

Figure 5:
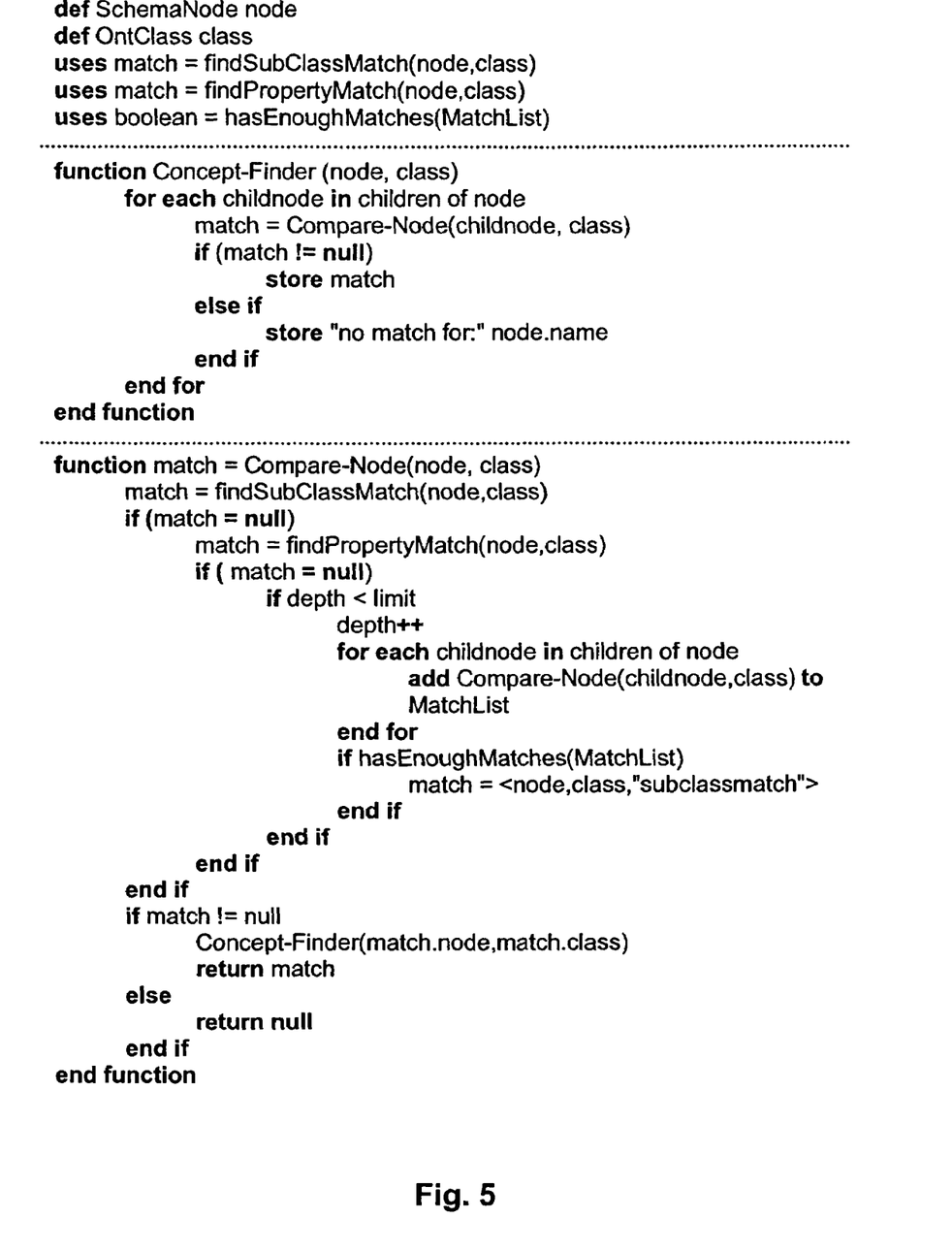
FIG. 5 shows exemplary pseudo code for implementing an embodiment of the invention.

FIG. 5 shows exemplary pseudo code for implementing an embodiment of the invention. The pseudo code has three parts which are separated by dotted lines. The pseudo code may be used for an implementation of finding a derived match. A first part includes declarations concerning a schema, an ontology, and parameters. A second part includes pseudo code of a function Concept-Finder that is configured to match child nodes of a node to entity groups assigned to a class. Each potential match is tested according to a function CompareNode that is included in a third part. The function CompareNode sequentially tests if a node can be matched to a class by using function findSubClassMatch, if a node can be matched to a property by using function findPropertyMatch, and if a derived match can be found. The derived match uses child nodes of the node up to a number of generations that is limited by a parameter depth. The function Compare-Node explores paths below a node of a tree representation of the schema.

Figure 6A:
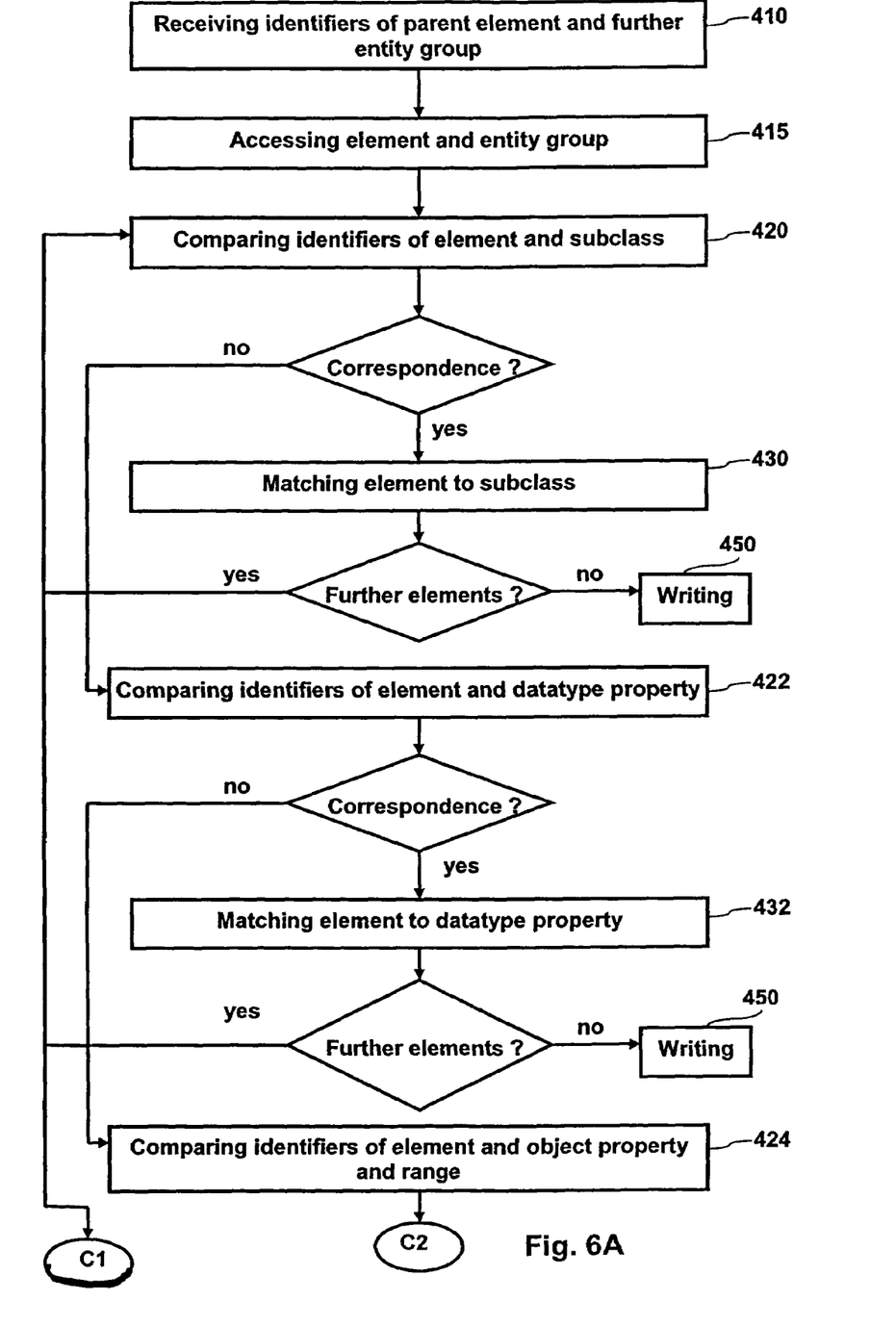
FIG. 6A is a part of a simplified flow diagram for an embodiment of the invention.

FIG. 6A is a part of a simplified flow diagram for an embodiment 400 of the invention. The embodiment 400 is a method 400 that is exemplary for a computer-implemented method for matching elements of a schema to entity groups of an ontology. The schema may be represented by an XSD. The method 400 includes accessing 415 an element of the schema stored in a first storage means and an entity group of the ontology stored in a second storage means. The second storage means may be identical to the first storage means or the second storage means may be different from the first storage means. The method 400 includes a method step matching the element of the schema to the entity group of the ontology in case that the element corresponds to the entity group according to a correspondence test. The element is related to the entity group because the element is identifiable with a child node of a parent node of a tree, the entity group includes a subclass of a class of a further entity group or a property of the class, and the further entity group matches to a parent element identifiable with the parent node.

A following description includes specific embodiments of method step matching the element to the entity group. The specific embodiments depend on entities of the entity group and on steps of the correspondence test. The following description further includes repeating the embodiments of matching with respect to further elements of the schema to further entity groups of the ontology. The further elements are identifiable with child nodes of a matched parent node of the tree and the further entity groups comprise subclasses of matched class of a matched entity group or properties of the matched class. The matched entity group matches to a matched parent element identifiable with the matched parent node.

The method 400 may optionally start with receiving 410 an identifier of the parent element and an identifier of the further entity group. The identifiers may for example have been entered manually by a user or predetermined by a developer.

It follows the method step accessing 415 the element of the schema and the entity group of the ontology. Following method steps may depend on the entity group, that is, if for example the entity group includes a subclass, a datatype property, or an object property with a range.

In case that the entity group includes a subclass of the class of the further entity group the correspondence test may include comparing 420 an identifier of the element with an identifier of the subclass. The correspondence test may be implemented according to previously described embodiments of the correspondence test. As an example, the correspondence test may include testing if any one of the following relations exists between identifiers of the element and the subclass: the identifiers are identical, the identifiers are synonymous, the identifiers are similar according to a first similarity test. In case of a correspondence between the identifiers it follows matching 430 the element to the subclass. Upon matching 430 it may follow to check if there are further elements of the schema available for matching to further entity groups. In case of a further available element the method may continue with comparing 420 identifiers including the identifier of the further available element. In case of no further elements the method may include writing 450 one or more matches that have been found by the method into a mapping file.

In case of no correspondence of the identifiers of the element and the subclass the method may continue comparing 422 the identifier of the element with an identifier of a datatype property of the class of the further entity group. Comparing 422 may include testing if any one of the following relations exist between identifiers of the element and the datatype property: the identifiers are identical, the identifiers are synonymous, the identifiers are similar according to a second similarity test. In case of a correspondence of the identifiers it may follow matching 432 the element to the datatype property and checking for further elements available for further matching. In case of a further element it may follow continuing with method step comparing 420 and in case of no further element it may follow writing 450 one or more matches that have been found by the method into a mapping file.

In case of no correspondence of the identifiers of the element and the datatype property it may follow comparing 424 the identifier of the element with the identifier of an object property and an identifier of a range. The correspondence test may include testing if the identifier of the element is similar to the identifier of the object property and the identifier of the range according to a third similarity test.

Figure 6B:
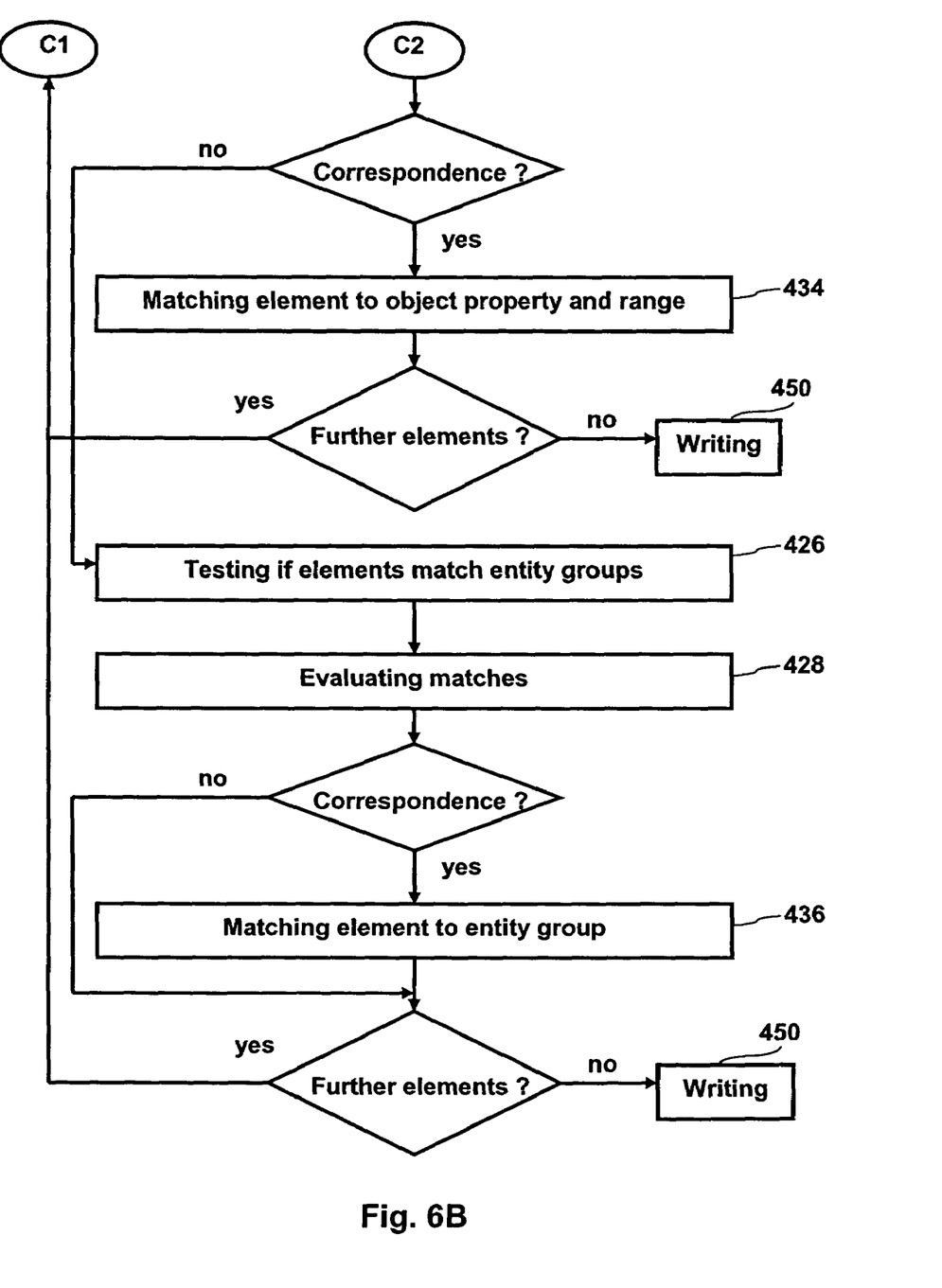
FIG. 6B is a further part of the simplified flow diagram for the embodiment of the invention.

In the figure are also two continuation points C1 and C2 that do not correspond to a method step but help a visualization of the method according to the figure and a following figure: continuation points C1 and C2 are part of the figure and the following figure and connect method steps of the figure and the following figure. In the figure, continuation point C1 is followed by method step comparing 420 identifiers of the element and the subclass and continuation point C2 follows comparing 424 identifiers of the element and the object property and the range.

FIG. 6B is a further part of the simplified flow diagram for the embodiment 400 of the invention. Continuation points C1 and C2 connect the further part with a previous part of a previous figure. According to a previous method step comparing 424 the identifiers the correspondence test may find a correspondence and it may follow matching 434 the element to the object property and the range and checking for a further element available for matching. In case of the further available element a following step may be comparing 420 identifiers including the identifier of the further available element. In case of no further available element it may follow writing 450 one or more matches that have been found by the method into a mapping file.

In case of no correspondence it may follow the correspondence test testing 426 if one or more elements identifiable with child nodes of the child node match to one or more entity groups that comprise subclasses of a class of the entity group, properties of the class, or properties of the subclasses. The child nodes of the child may be first generation child nodes of the child node or second or higher generation child nodes of the child node, that is, the child nodes may for example be child nodes of child nodes of the child node. It may be that the number of generations for which matches are tested is restricted. The correspondence test may further include evaluating 428 matches of the one or more elements to the one or more entity groups according to an evaluation function. The evaluation function may include counting the matches including the one or more elements and to compare a number of matches to a number of the one or more elements. Such a match involving the one or more elements is a derived match and it may follow characterizing the derived match as a derived match. In case that the correspondence test results in a correspondence it may follow matching 436 the element to the entity group, which may include a class or a property. In case of a further element available for further matches a following step may be comparing 420 identifiers including the identifier of the further available element. In case of no further available element it may follow writing 450 one or more matches that have been found by the method into the mapping file. In case of no correspondence, that is, a derived match is not possible it may follow characterizing the element as unmatchable. Such a characterization may for example in the following be written into the mapping file or into a log file. In a further example, it may be brought to the attention of a user by using a graphical interface. It may follow checking the schema for a further element available for a match according to the figure. In a further example, matches of elements to entity groups may be written to the mapping file following each successful matching.

An embodiment of the invention may be a computer program product. The computer program product may have instructions that are transferable to a computer system and that cause the computer system to execute method steps of an embodiment of the invention.

The computer program product may be stored on computer-readable media for carrying or having computer-executable instructions or data structures. Such computer-readable media may be any available media that can be accessed by a general purpose or special purpose computer. By way of example, such computer-readable media may include RAM, ROM, EPROM, EEPROM, CD-ROM or other optical disk storage, magnetic disk storage or other magnetic storage devices, or any other medium that may be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions include, for example, instructions and data which cause a general purpose computer, a special purpose computer, or a special purpose processing device to perform a certain function or group of functions. Furthermore, computer-executable instructions include, for example, instructions that have to be processed by a computer to transform the instructions into a format that is executable by a computer. The computer-executable instructions may be in a source format that is compiled or interpreted to obtain the instructions in the executable format. In case that the computer-executable instructions are transformed, a first computer may for example transform the computer-executable instructions into the executable format and a second computer may execute the transformed instructions.

The invention is described in the general context of method steps, which may be implemented in one embodiment by a computer program product including computer-executable instructions, such as program code, executed by computers in networked environments. Generally, program modules include for example routines, programs, objects, components, or data structures that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments may be operated in a networked environment using logical connections to one or more remote computers having processors. Logical connections may include for example a local area network (LAN) and a wide area network (WAN). The examples are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

The invention claimed is:

1. A system for matching elements of a schema to entity groups comprised of classes or properties of an ontology, the system comprising:
   a first storage configured to store an element of the schema that is identifiable with a child node of a parent node of a tree;
   a second storage configured to store an entity group of the ontology that comprises a subclass of a class of a further entity group or a property of the class, the further entity group matching to a parent element identifiable with the parent node;

an access unit configured to access the element of the schema and the entity group of the ontology; and a match unit configured to match the element of the schema to the entity group of the ontology in case that the element corresponds to the entity group according to a correspondence test.

2. The system of claim 1 further comprising a receiver unit configured to receive an identifier of the parent element and an identifier of the further entity group.

3. The system of claim 1 wherein the correspondence test is configured to compare an identifier of the element with an identifier of a subclass of the class of the further entity group.

4. The system of claim 3 wherein the correspondence test is configured to test if any one of the following relations exists between identifiers of the element and the subclass: the identifiers are identical, the identifiers are synonymous, the identifiers are similar according to a first similarity test.

5. The system of claim 1 wherein the correspondence test is configured to compare an identifier of the element with an identifier of a datatype property of the class of the further entity.

6. The system of claim 5 wherein the correspondence test is configured to test if any one of the following relations exists between identifiers of the element and the datatype property: the identifiers are identical, the identifiers are synonymous, the identifiers are similar according to a second similarity test.

7. The system of claim 1 wherein the correspondence test is configured to compare an identifier of the element with an identifier of an object property of the class of the further entity group and an identifier of a range of the object property.

8. The system of claim 7 wherein the correspondence test is configured to test if the identifier of the element corresponds to the identifier of the object property and the identifier of the range according to a third similarity test.

9. The system of claim 1 wherein the correspondence test is configured to:

test if one or more elements identifiable with child nodes of the child node match to one or more entity groups that comprise subclasses of a class of the entity group, properties of the class, or properties of the subclasses; and evaluate matches of the one or more elements to the one or more entity groups according to an evaluation function.

10. The system of claim 9 further characterizing the matched element and entity group as a derived match.

11. The system of claim 1 further comprising a write unit configured to write to a mapping file a description of a match of the element of the schema to the entity group of the ontology.

12. The system of claim 1 wherein the schema is defined according to an extensible markup language schema definition XSD.

13. A computer-implemented method for matching elements of a schema to entity groups comprised of classes or properties of an ontology, the method comprising:

accessing an element of the schema stored in a first storage and an entity group of the ontology stored in a second storage; and matching the element to the entity group in case that the element corresponds to the entity group according to a correspondence test, wherein the element is identifiable with a child node of a parent node of a tree and the entity group comprises a subclass of a class of a further entity group or a property of the class, the further entity group matching to a parent element identifiable with the parent node.

14. The method of claim 13 further receiving an identifier of the parent element and an identifier of the further entity group.

15. The method of claim 13 wherein the correspondence test comprises comparing an identifier of the element with an identifier of a subclass of the class of the further entity group.

16. The method of claim 15 wherein comparing the identifier of the element with the identifier of the subclass comprises testing if any one of the following relations exists between identifiers of the element and the subclass: the identifiers are identical, the identifiers are synonymous, the identifiers are similar according to a first similarity test.

17. The method of claim 13 wherein the correspondence test comprises comparing an identifier of the element with an identifier of a datatype property of the class of the further entity group.

18. The method of claim 17 wherein comparing the identifier of the element with the identifier of the datatype property comprises testing if any one of the following relations exists between identifiers of the element and the datatype property: the identifiers are identical, the identifiers are synonymous, the identifiers are similar according to a second similarity test.

19. The method of claim 13 wherein the correspondence test comprises comparing an identifier of the element with an identifier of an object property of the class of the further entity group and an identifier of a range of the object property.

20. The method of claim 19 wherein comparing the identifier of the element with the identifier of the object property and the identifier of the range comprises testing if the identifier of the element is similar to the identifier of the object property and the identifier of the range according to a third similarity test.

21. The method of claim 13 wherein the correspondence test comprises:

testing if one or more elements identifiable with child nodes of the child node match to one or more entity groups that comprise subclasses of a class of the entity group, properties of the class, or properties of the subclasses; and evaluating matches of the one or more elements to the one or more entity groups according to an evaluation function.

22. The method of claim 21 further characterizing the matched element and entity group as a derived match.

23. The method of claim 13 further repeating matching further elements of the schema to further entity groups of the ontology, wherein the further elements are identifiable with child nodes of a matched parent node of the tree and the further entity groups comprise subclasses of matched class of a matched entity group or properties of the matched class, the matched entity group matching to a matched parent element identifiable with the matched parent node.

24. The method of claim 13 further writing a description of a match of the element of the schema to the entity group of the ontology into a mapping file.

25. The method of claim 13 wherein the schema is defined according to an extensible markup language schema definition XSD.

26. A computer program product comprising instructions that are transferable to a computer system and that cause the computer system to execute method steps of claim 13.

* * * * *